US00RE47979E

(19) United States
(12) Reissued Patent
O'Neill

(10) Patent Number: US RE47,979 E
(45) Date of Reissued Patent: May 12, 2020

(54) PACKAGING

(71) Applicant: SUGARFINA, INC, Inglewood, CA (US)

(72) Inventor: Rosie Colleen O'Neill, Los Angeles, CA (US)

(73) Assignee: SUGARFINA, INC., El Segundo, CA (US)

(21) Appl. No.: 29/607,130

(22) Filed: Jun. 9, 2017

Related U.S. Patent Documents

Reissue of:
(64) Patent No.: Des. 731,323
Issued: Jun. 9, 2015
Appl. No.: 29/499,567
Filed: Aug. 15, 2014

(51) LOC (12) Cl. ..... 09-03
(52) U.S. Cl.
USPC ..... D9/721
(58) Field of Classification Search
USPC ..... D9/414, 418, 715, 721, 737, 756, 759; D3/201, 273, 274, 302; D7/629
(Continued)

(56) References Cited

U.S. PATENT DOCUMENTS 228,158 A * 5/1880 Woods ..... 206/425
D36,435 S 7/1903 Daggett
(Continued)

FOREIGN PATENT DOCUMENTS

DE M9202895-0002 9/1992
DE G1997182206 3/1993
(Continued)

OTHER PUBLICATIONS

Sugarfina Partners With Sanrio to Create the Cutest Hello Kitty Candy on the Planet. [online] Published Sep. 17, 2017. Retrieved Sep. 17, 2017 from URL: https://www.popsugar.com/food/photo-gallery/44018877/image/44018885/Sugarfinas-Pop-Up-Candy-Bento-Box-30.

(Continued)

*Primary Examiner* — Philip S Hyder
(74) *Attorney, Agent, or Firm* — Troutman Sanders LLP; James E. Schutz; Chris N. Davis

(57) CLAIM

The ornamental design for a packaging, substantially as shown and described.

DESCRIPTION

FIG. 1 is an exploded perspective view of a packaging showing my new design;
FIG. 2 is a perspective view thereof, shown without the packaging tray for clarity of illustration;
FIG. 3 is a side view thereof;
FIG. 4 is a top view thereof;
FIG. 5 is an end view thereof; [and.]
FIG. 6 is a second end view thereof[.];
*FIG. 7 is an exploded perspective view of an alternate embodiment of the packaging, showing my new design;*
*FIG. 8 is a perspective view thereof, shown without the packaging tray for clarity of illustration;*
*FIG. 9 is a side view thereof;*
*FIG. 10 is a top view thereof;*
*FIG. 11 is an end view thereof; and,*
*FIG. 12 is a second end view thereof.*
The broken lines shown represent unclaimed subject matter and form no part of the claimed design. The shade lines shown represent surface shading and not surface ornamentation.

1 Claim, 8 Drawing Sheets

Figure 1:
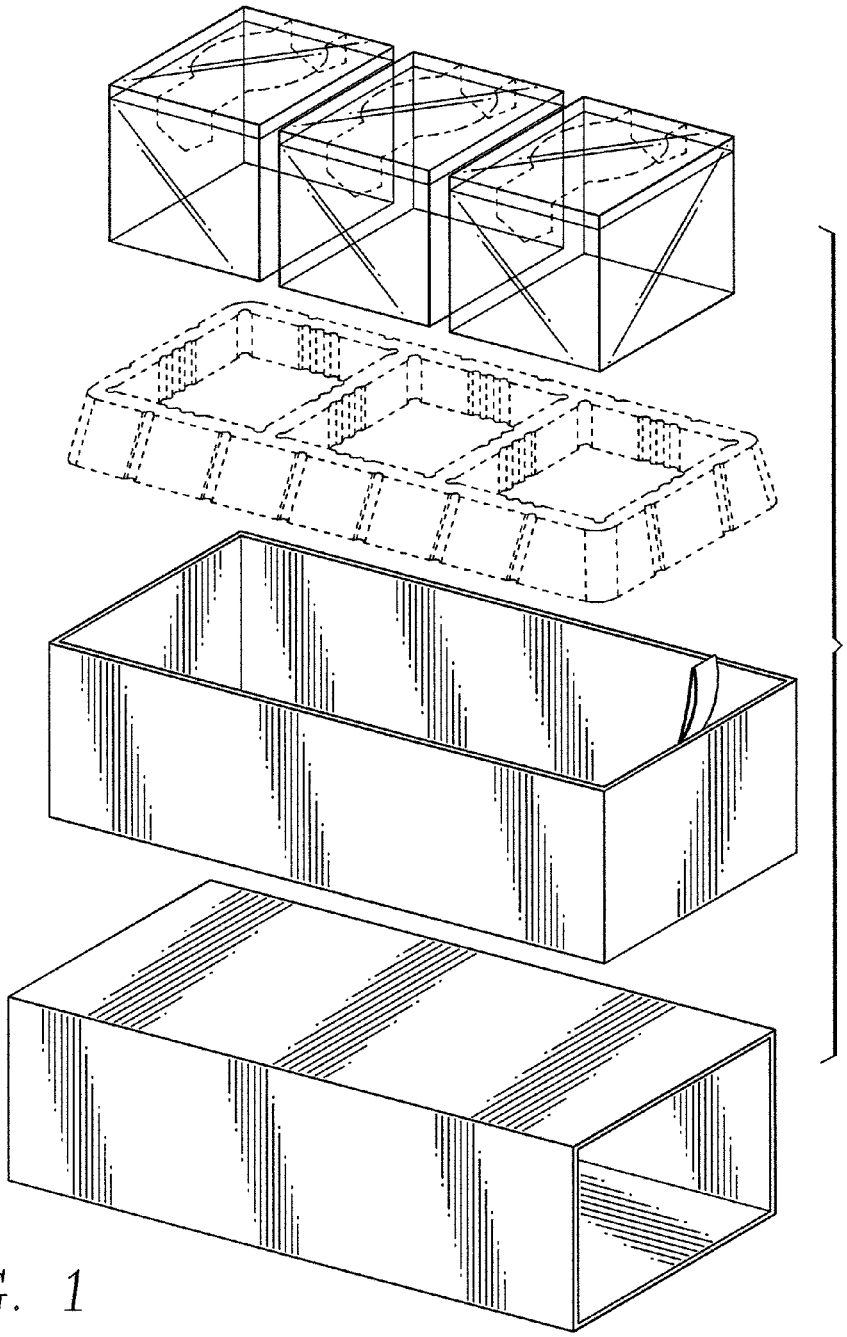
Figure 2:
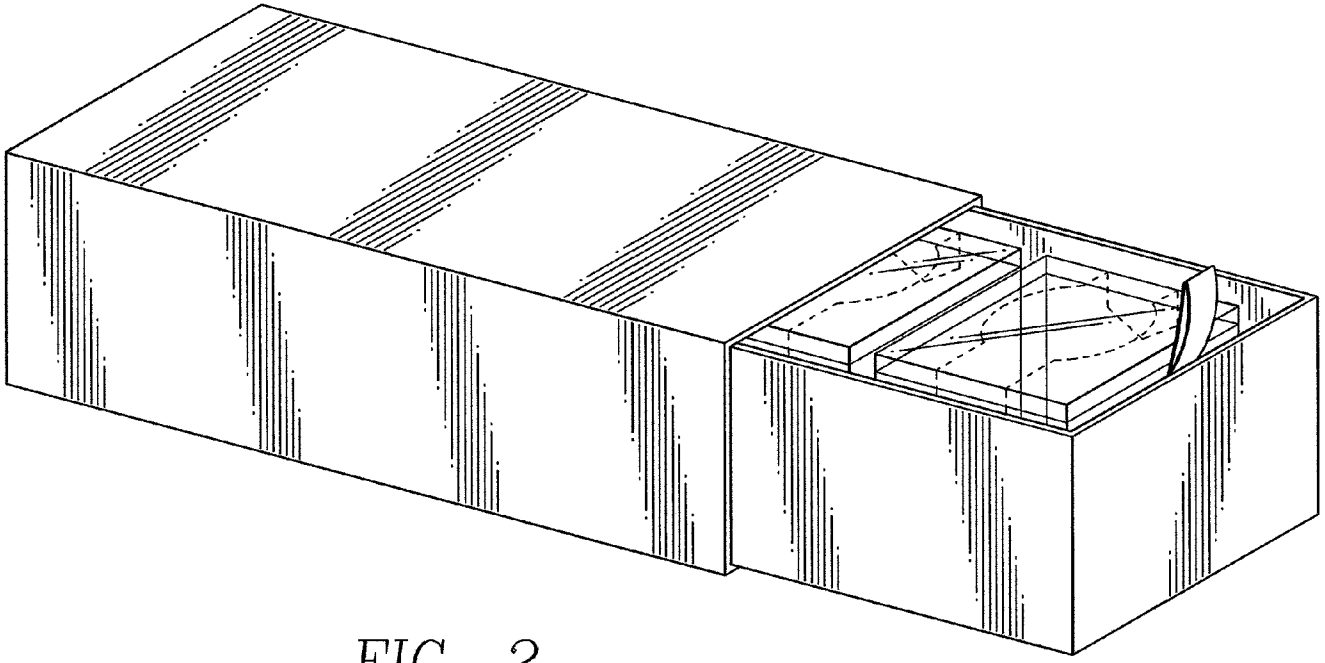
Figure 3:
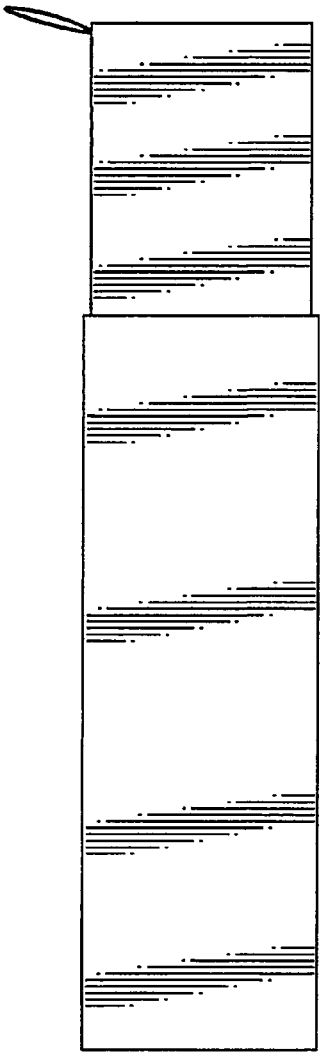
Figure 4:
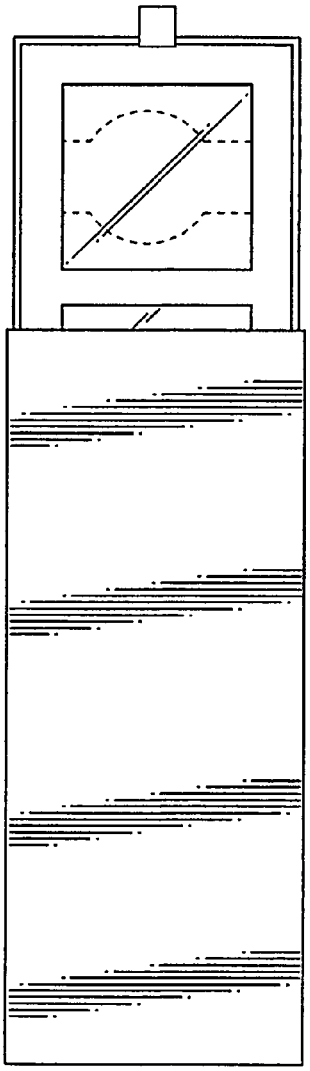
Figure 6:
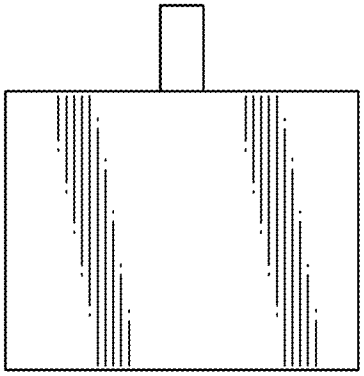
Figure 5:
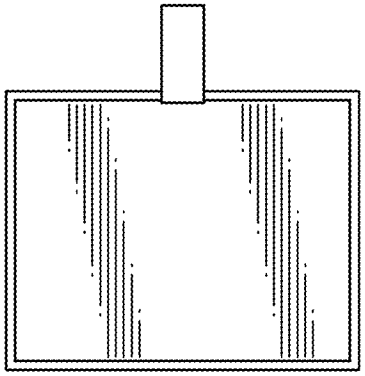

Matter enclosed in heavy brackets [ ] appears in the original patent but forms no part of this reissue; matter printed in italics indicates the additions made by reissue.

(NEW)

(58) Field of Classification Search
CPC .. B65D 5/4204; B65D 5/5021; B65D 5/4208; B65D 85/1045; B65D 5/5035; B65D 5/5213; B65D 5/22; B65D 5/38; B65D 2519/00273; B65D 5/42; B65D 5/5038; B65D 2519/00323; B65D 5/5028; B65D 5/5253; B65D 25/04; B65D 5/5016; B65D 5/68; B65D 85/00; B65D 2543/00194; B65D 2543/00296; B65D 2519/00711; B65D 2519/00034; B65D 2519/00069; B65D 81/368; B65D 21/0233; Y10S 206/804; Y10S 206/82
See application file for complete search history.

(56) References Cited

U.S. PATENT DOCUMENTS

D42,846 S 8/1912 Farrell
1,162,840 A * 12/1915 Wood ..... 229/125.125
1,588,857 A * 6/1926 Sherman ..... 206/521.1
D71,513 S 11/1926 Austin
1,620,789 A * 3/1927 Urban, Jr. ..... 229/122.21
1,697,880 A 1/1929 Peter
1,762,923 A 6/1930 Fegely
D86,128 S 2/1932 Levkoff
1,871,617 A 8/1932 King
1,892,092 A 12/1932 Barad
1,899,547 A 2/1933 Addis et al.
1,994,159 A * 3/1935 Wurzburg ..... 312/108
D95,429 S 4/1935 James et al.
2,522,049 A 9/1950 Lang
2,541,173 A * 2/1951 Moore ..... 229/125.125
2,597,377 A 5/1952 Robinson
2,604,980 A * 7/1952 Reid ..... 206/121
2,751,135 A * 6/1956 Kessler ..... 229/125.125
2,782,951 A 2/1957 Inman
2,790,589 A * 4/1957 Moore ..... 229/125.125
3,004,661 A 10/1961 Schumann
3,126,093 A 3/1965 Bradley et al.
3,357,543 A 12/1967 Taggart
3,423,006 A * 1/1969 Stedman ..... 229/125.39
3,494,534 A 2/1970 McFarland et al.
3,600,871 A 8/1971 Farquhar
3,660,934 A * 5/1972 Pollack et al. ..... 47/84
D228,158 S 8/1973 Woods
D242,771 S * 12/1976 Papillon ..... D9/761
D244,085 S 4/1977 Giddings et al.
4,139,096 A 2/1979 Sieger
D258,938 S 4/1981 Spitzer
4,293,079 A 10/1981 Lytle
D292,876 S 11/1987 Grunhut
D292,877 S 11/1987 Grunhut
4,713,928 A 12/1987 Tisma
4,757,898 A 7/1988 Klein
D307,504 S 4/1990 Silcox
D315,297 S 3/1991 Campbell
D317,717 S 6/1991 Carol
D317,718 S 6/1991 Carol
5,038,940 A 8/1991 Okabe
5,096,056 A 3/1992 Garcia
D327,004 S 6/1992 Nadel
D329,601 S 9/1992 Samelson
D333,615 S 3/1993 Lutler
D335,819 S 5/1993 Campbell
D344,020 S 2/1994 Pavely
5,375,706 A 12/1994 Perez
D361,508 S 8/1995 Schnack
D361,661 S 8/1995 Masuda
D373,723 S 9/1996 Healey
5,555,982 A 9/1996 Kuhn et al.
5,590,786 A 1/1997 Jaycox
5,603,558 A 2/1997 Zimmer
D380,417 S 7/1997 Hardy
D380,926 S 7/1997 Goodburn et al.
5,682,999 A 11/1997 Larson
5,738,221 A 4/1998 Van Witt et al.
5,791,468 A 8/1998 House
5,817,510 A 10/1998 Pandey et al.
D411,308 S 6/1999 Pandey et al.
D424,296 S 5/2000 David
D424,425 S 5/2000 Ngai
D426,902 S 6/2000 Hardy et al.
D433,630 S 11/2000 Lubineau-Bigot et al.
6,349,820 B1 2/2002 Kelley et al.
D455,073 S 4/2002 Mizrahi
D464,568 S 10/2002 Sisinni
D464,885 S 10/2002 Weinstein et al.
D468,100 S 1/2003 Bowling
6,533,166 B1 3/2003 Kaiss
D477,911 S 8/2003 Stuart
D492,194 S 6/2004 Kim
D494,862 S 8/2004 Sisinni
6,923,556 B1 8/2005 Baker, III
D510,528 S 10/2005 Funk
D511,681 S 11/2005 Cogley et al.
D521,733 S 5/2006 Kim
D522,376 S 6/2006 Hales
D528,794 S 9/2006 Lanham et al.
D536,246 S 2/2007 Schneider
7,264,123 B2 9/2007 Reed
D553,495 S 10/2007 Vandecasteele et al.
D568,765 S 5/2008 Miles
D580,263 S 11/2008 Yi Man
D584,053 S 1/2009 Abdo et al.
D596,485 S 7/2009 Andre et al.
D603,720 S * 11/2009 Cesare et al. ..... D9/721
D609,116 S 2/2010 Kim
7,757,843 B2 * 7/2010 Katsis ..... 206/1.5
D621,548 S 8/2010 Chen
D643,306 S 8/2011 Martinez et al.
8,006,842 B1 8/2011 Loughlin, Jr. et al.
D646,984 S 10/2011 Moore et al.
8,109,389 B1 2/2012 Amer
D657,284 S 4/2012 Young
D663,520 S 7/2012 Antler
D664,312 S 7/2012 Bizzle
8,272,509 B1 9/2012 McCutchen
D669,352 S 10/2012 Paslawski
D670,931 S 11/2012 Tapper
D670,932 S 11/2012 Tapper
D673,864 S 1/2013 Read et al.
D675,539 S 2/2013 Biglarians
D682,119 S 5/2013 Buford
D685,578 S 7/2013 Pestell
D686,065 S 7/2013 Kuo et al.
D686,491 S 7/2013 Kuo et al.
D687,321 S 8/2013 Pralus
D690,554 S 10/2013 Presley
D691,465 S 10/2013 O'Brien et al.
D691,900 S 10/2013 Kraus
D698,639 S 2/2014 Fletcher et al.
D698,664 S 2/2014 Abbott
D700,462 S 3/2014 Boos
D704,550 S 5/2014 Mattila et al.
D706,627 S 6/2014 Olsson et al.
D709,305 S 7/2014 Tapper
D709,306 S 7/2014 Tapper
D709,364 S 7/2014 Olsson et al.
D712,176 S 9/2014 Tamilarasan
D712,748 S 9/2014 Akana et al.
D713,739 S 9/2014 Akana et al.
D717,165 S 11/2014 Kwak et al.
D722,870 S 2/2015 Fohner et al.
D728,358 S 5/2015 Belamich
D728,636 S 5/2015 Kunz
D729,636 S 5/2015 Steinberger
D730,749 S 6/2015 Young et al.
D731,323 S 6/2015 O'Neill
D731,325 S 6/2015 Loessin
D733,314 S 6/2015 Lui
D733,315 S 6/2015 Lui
D733,317 S 6/2015 Lui
D733,318 S 6/2015 Lui
9,061,790 B2 6/2015 Yagishita

(56) References Cited

U.S. PATENT DOCUMENTS

| | | | |
|---|---|---|---|
| D734,075 | S | 7/2015 | Tapper |
| D738,721 | S | 9/2015 | Song et al. |
| D741,193 | S | 10/2015 | Lohuis |
| D748,280 | S | 1/2016 | Lui |
| D754,408 | S | 4/2016 | Garrett |
| D755,641 | S | 5/2016 | O'Neill |
| D756,560 | S | 5/2016 | Ghiotti et al. |
| D756,804 | S | 5/2016 | Gross |
| D758,191 | S | 6/2016 | Tu et al. |
| D763,104 | S | 8/2016 | Akana et al. |
| D763,683 | S | 8/2016 | O'Neill |
| D763,684 | S | 8/2016 | O'Neill |
| D764,911 | S | 8/2016 | Glass et al. |
| D768,008 | S | 10/2016 | Akana et al. |
| D769,727 | S | 10/2016 | Lohuis et al. |
| D769,986 | S | 10/2016 | Timg |
| D772,057 | S | 11/2016 | Adams et al. |
| D774,388 | S | 12/2016 | Xia |
| 9,533,791 | B2 | 1/2017 | Fath |
| D779,879 | S | 2/2017 | Walker |
| D780,569 | S | 3/2017 | Bard et al. |
| D780,570 | S | 3/2017 | Bard et al. |
| D787,186 | S | 5/2017 | Thurbin |
| D787,320 | S | 5/2017 | Gill et al. |
| D805,891 | S | 12/2017 | Bard et al. |
| D805,892 | S | 12/2017 | Bard et al. |
| D814,925 | S | 4/2018 | Davidson et al. |
| D821,087 | S | 6/2018 | Lihotzky et al. |
| D823,134 | S | 7/2018 | O'Neill |
| D824,777 | S | 8/2018 | Arnett, Jr. |
| D826,069 | S | 8/2018 | O'Neill |
| 10,053,274 | B1 | 8/2018 | O'Neill |
| D829,569 | S | 10/2018 | O'Neill |
| D831,479 | S | 10/2018 | Lylyk |
| 2002/0108880 | A1 | 8/2002 | Krupa et al. |
| 2006/0266672 | A1 | 11/2006 | Young |
| 2006/0283733 | A1 | 12/2006 | Masa |
| 2007/0095693 | A1 | 5/2007 | DeLuca |
| 2008/0190788 | A1 | 8/2008 | Cziraky |
| 2009/0242455 | A1 | 10/2009 | Adams et al. |
| 2010/0012672 | A1 | 1/2010 | Piron |
| 2010/0187227 | A1 | 7/2010 | Wang |
| 2011/0174166 | A1 | 7/2011 | Sparacio et al. |
| 2012/0168434 | A1 | 7/2012 | Cervera et al. |
| 2012/0168443 | A1 | 7/2012 | Maness |
| 2013/0161378 | A1 | 6/2013 | Nebeker et al. |
| 2013/0220880 | A1 | 8/2013 | Glass et al. |
| 2013/0240387 | A1 | 9/2013 | Pugh |
| 2013/0248531 | A1 | 9/2013 | Lane |
| 2014/0021086 | A1 | 1/2014 | Roesler |
| 2014/0166736 | A1 | 6/2014 | Kato |
| 2014/0312107 | A1 | 10/2014 | Nash |
| 2015/0093509 | A1 | 4/2015 | Kennedy et al. |
| 2015/0232245 | A1 | 8/2015 | Fullan |
| 2015/0321811 | A1 | 11/2015 | Yeung |
| 2016/0009473 | A1 | 1/2016 | Korinek et al. |
| 2016/0046404 | A1 | 2/2016 | Cheeser et al. |
| 2016/0185511 | A1 | 6/2016 | O'Neill |
| 2016/0264285 | A1 | 9/2016 | Madwar et al. |
| 2017/0050797 | A1 | 2/2017 | Farid et al. |
| 2017/0076343 | A1 | 3/2017 | Bernstein et al. |
| 2017/0138660 | A1 | 5/2017 | Huckaby et al. |
| 2017/0152092 | A1 | 6/2017 | Glass et al. |

FOREIGN PATENT DOCUMENTS

| | | | |
|---|---|---|---|
| EP | 2042439 | A1 | 4/2009 |
| IL | 51964 | | 10/2013 |
| JP | 1503649 | S | 7/2014 |
| JP | 1530877 | S | 8/2015 |
| JP | 1537477 | S | 11/2015 |
| JP | 1541182 | S | 1/2016 |
| JP | 1562136 | S | 1/2017 |
| JP | D1600162 | | 3/2017 |
| KR | 30-0377284-0000 | | 3/2005 |
| KR | 30-04151920-0000 | | 6/2007 |
| TW | 099232 | | 5/1988 |
| TW | D119491 | | 10/2007 |
| TW | D186765 | S | 11/2017 |
| WO | 2017125444 | A1 | 7/2017 |

OTHER PUBLICATIONS

Rigid Set-up Box, Wine and Champagne Chocolate Leather Gift Box, Faux Leather, Dark Brown, Qty/CASE-6. [online] Retrieved Nov. 22, 2017 from URL: https://www.aspecialtybox.com/RG00F-00493-C.

House Drawer Gift Box/CMXSSGB-10. [online] Retrieved Nov. 22, 2017 from URL: http://www.charmpackaging.com/special-shape-gift-bodhouse-drawer-gift-box-cmxssgb-010.html.

Chocomize, Candy Cube Boxes, www.chocomize.com/candy-cube-box-9pc.html (Jun. 29, 2017).

MidNite Snax, Signature Sets, http://midnitesnax.com/home_page_files/view/1265/file.pdf (Jun. 29, 2017).

Sweet Pete's, Build-Candy-Cube-Box, https://www.sweetpetescandy.com/collections/build-a-candy-cube-box (Jun. 29, 2017).

Sweet Pete's, Pete's Picks Collection, www.sweetpetescandy.com:80/collections/boxes (Mar. 23, 2016).

Sweitzer Candy Shop, Gifts, https://sweitzercandy.com/index.php/gift-boxes.html (Jun. 29, 2017).

Sugarfina, Design Your Own Bento, www.sugarfina.com/shop/gift-type/design-your-own-bento (Jun. 29, 2017).

Sugarfina, Custom Catalogue, https://issuu.com/sugarfina/docs/2017-corporatecatalog-ppai-webversi (Jun. 29, 2017).

Teaspressa, Tea + Cube, available at https://teaspressa.com/collections/gifts/products/tea-cube (Jun. 29, 2017).

Sweitzer Candy Gift Box 8, available Feb. 21, 2015, [online], [site visited Aug. 2, 2017]. Available from internet, <URL: https://web.archive.org/web/20150221225755/https://sweitzercandy.com/index.php/gift-boxes.html, 2 pages.

Sweitzer Candy Gift Box 4, available Feb. 21, 2015, [online], [site visited Aug. 2, 2017]. Available from internet, <URL: https://web.archive.org/web/20150221225755/https://sweitzercandy.com/index.php/gift-boxes.html, 2 pages.

"A Taste of Paradise," Collection by Sugarfina, available Aug. 2, 2017, [online], [site visited Aug. 2, 2017]. Available from internet, <URL:https://www.sugarfina.com, 1 page.

Cubetas, [online], [site visited Aug. 16, 2017]. Available from internet, <URL:http://cubetas.jp/>, 19 pages.

Sugarfina (Beverly Hills, CA) • The Episodic Eater; https://www.theepisodiceater.com/sugarfina-beverly-hills-ca/; unknown date; 29 pages.

Sugarfina Bevery Hills & Trio of Goodies—Candy Blog; http://www.candyblog.net/blog/item/sugarfina_trio_of_goodies; Dec. 16, 2013; 11 pages.

Sugarfina—Candy Happiness!; http://luluandlattes.com/2013/06/27/sugarfina-candy-happiness/; Jun. 27, 2013; 11 pages.

Sugarfina Launches—Atlanta's Lenox Square Just Got Sweeter!; http://www.momsmagicalmiles.com/sugarfina-launches-atlantas-lenox/; Nov. 6, 2015; 15 pages.

Sugarfina << MDH Mark D Hogan; https://markdhogan.wordpress.com/tag/sugarfina/; Aug. 29, 2013; 7 pages.

Sugarfina Part I—Foodette Reviews; http://foodettereviews.com/?p=24; Sep. 10, 2013; 7 pages.

Sugarfina: One Candy-Coated Startup's Plans For A Lucrative Exit—But First A Trip To Space; https://www.forbes.com/sites/meghancasserly/2013/04/09/sugarfina-facebook-candy-shop-outerspace/#78cb39dd6e74; Apr. 9, 2013; 6 pages.

Sugarfina Representative Facebook posts; https://www.facebook.com/Sugarfina; 25 pages.

Sugarfina Representative Instagram posts; https://www.instagram.com/sugarfina/?h=en; 40 pages.

Sugarfina Representative Twitter posts; https://twitter.com/sugarfina; 91 pages.

Sugarfina: Sampling the Sweets—York Avenue; https://yorkavenueblog.com/sugarfina-sampling-sweets/; Sep. 8, 2014; 7 pages.

(56) References Cited

OTHER PUBLICATIONS

Sugarfina: The Chocolates—Candy Blog; http://www.candyblog.net/blog/item/sugarfina_the_chocolates; Jul. 16, 2013; 11 pages.
Sugarfina: The Gummis—Candy Blog; http://www.candyblog.net/blog/item/sugarfina_the_gummis; Jul. 10, 2013; 11 pages.
Sugarfina—Thrillist LA; https://www.thrillist.com/eat/los-angeles/we-fed-a-kid-absinthe-candy-here-s-what-happened-thrillist-la; Dec. 16, 2013; 35 pages.
Talking Shop: Sugarfina—Sugar Paper; https://sugarpaper.com/blogs/news/87503553-talking-shop-sugarfina; Feb. 11, 2016; 13 pages.
Treat yourself: Sugarfina!_Twinkie Chan Blog; http://blog.twinkiechan.com/2012/09/20/treat-yourself-sugarfina/; Sep. 20, 2012; 13 pages.
Whispering Angel Rosé-Infused Gummy Bears are Summer's Hottest Sweet—The Glamorous Gourmet; https://theglamorousgourmet.com/whispering-angel-rose-gummy-bears-summers-hottest-sweet/; Jul. 31, 2016, 13 pages.
White Two Piece Gift Box (Exact Date Unknown); believed available as of Aug. 2012; 1 page.
Colored Deluxe Two Piece Gift Boxes (Exact Date Unknown); believed available as of Aug. 2012; 10 pages.
Clear flush-Lid Amac Boxes (Exact Date Unknown); believed available as of Feb. 27, 2010; 10 pages.
Search Report for Taiwan Design Patent Application No. 106306912 dated Jun. 12, 2018; 1 page.
Alto Nivel, Top 10 de Chocolates Gourmet de Lujo (Jun. 26, 2011) (available at https://www.altonivel.com.mx/estilo-de-vida/top-10-de-chocolates-gourmet-de-lujo/), 13 pages.
Alto Nivel, Top 10 de Chocolates Gourmet de Lujo (Jun. 26, 2011) (available at https://www.altonivel.com.mx/estilo-de-vida/top-10-de-chocolates-gourmet-de-lujo/), machine translation, 12 pages.
MAGMA Google Group, "Sweet" (Mar. 11, 2011) (available at https://groups.google.com/forum/print/msg/magma-massar/sUT3yoay0mE/5gOUk5AKMzQJ?ctz=4721738_76_76_104100_72_446760), 11 pages.
Yelp photo uploaded by Adam D. on Mar. 8, 2014 (available at https://www.yelp.com/biz_photos/mariebelle-new-york-3?select=ggKtO2Mx-jLH82WREkN7iA), 1 page.
Yelp photo uploaded by Farhana S. on May 25, 2015 (available at https://www.yelp.com/biz_photos/mariebelle-new-york-3?select=bewjlhJxzOfxHTN2m0-Ghg), 1 page.
Yelp photo uploaded by Amy K. on Feb. 20, 2016 (available at https://www.yelp.com/biz_photos/mariebelle-new-york-3?select=aSrM2Gu_DuexeX67uD4p9Q), 1 page.
Yelp photo uploaded by Adrienne D. on Nov. 8, 2016 (available at https://www.yelp.com/biz_photos/mariebelle-new-york-3?select=tEA9kZR4JsKFdBSu8uSIIQ), 1 page.
Yelp photo uploaded by Dani V. on Jan. 4, 2007 (available at https://www.yelp.com/biz_photos/mariebelle-new-york-3?select=5MkHMGtiRD-hWFLhdHlvKg), 1 page.
Banat-Style.com, Mar. 1, 2010 (available at http://forums.banat-style.com/arabgirlsfashion143108/), 46 pages.
Mariebelle.com archived webpage (available at https://web.archive.org/web/20070624034428/http://www.mariebelle.com/category.cfm?showCategoryID=12), purported by the Internet Archive WayBack Machine to have been publicly available Jun. 24, 2007.
Bonbonist—https://thebonbonist.com/; Oct. 18, 2017, 4 pages.
Bonbonist Box Photo—Facebook—https://www.facebook.com/thebonbonist/photos/a.1493876617357861.1073741829.1290401221038736/1493876580691198/?type=3&theater; Oct. 1, 2017, 1 page.
Bouquet Bar 3 Piece Box Photo—Instagram—https://www.instagram.com/p/BPs-h6rBWic/?taken-by=thebouquetbar; Jan. 25, 2017, 1 page.
Bouquet Bar 6 Piece Box Photo—"It's Time to Ditch the Red Roses: Six Better Ways to Give Your Valentine Flowers," People Home & Travel; Jan. 31, 2017, 10 pages.
Bouquet Bar 6 Piece Photo—Instagram—https://www.instagram.com/p/Bp-9l12hV9Q/?taken-by=thebouquetbar; Feb. 1, 2017, 1 page.
Chocomize 2 Piece Box—https://www.chocomize.com/candy-cubes-2pack.html; Oct. 16, 2017, 4 pages.
Chocomize 3 Piece Box Photo—Facebook—https://www.facebook.com/Chocomize/photos/a.423529781180.220124.176532311180/10154561729211181/?type=3&theater; Nov. 11, 2016, 1 page.
Chocomize 6 Piece Box—https://www.chocomize.com/candy-cube-6pcs-box.html; Oct. 16, 2017, 3 pages.
Chocomize 9 Piece Box Photo—Instagram—https://www.instagram.com/p/BI5r4s6BLH7/?taken-by=chocomize; Aug. 9, 2016, 1 page.
Chocomize 9 Piece Box Photo—Instagram—https://www.instagram.com/p/BMpjEEUhpqV/?taken-by=chocomize; Nov. 10, 2016, 1 page.
Chocomize 9 Piece Box Photo—Instagram—https://www.instagram.com/p/BMrp0YdhQeU/?taken-by=chocomize; Nov. 11, 2016, 1 pages.
Cubetas 2 Piece and 3 Piece Box Photo—Instagram—https://www.instagram.com/p/BMyWwq0BQoH/?taken-by=cubetas.2016; Nov. 14, 2016, 1 page.
Cubetas 2 Piece and 3 Piece Box Photo—Instagram—https://www.instagram.com/p/BNtkhJpBzYm/?taken-by=cubetas.2016; Dec. 7, 2016, 1 page.
Cubetas 2 Piece Box Photo—Instagram—https://www.instagram.com/p/BMQ9Bjihqyz/?taken-by=cubetas.2016; Nov. 1, 2016, 1 page.
Cubetas 3 Piece Box Photo—Instagram—https://www.instagram.com/p/BPrxqTThloh/?taken-by=cubetas.2016; Jan. 25, 2017, 1 page.
Foxes Events 6 Piece Box Photo—Instagram—https://www.instagram.com/p/BQVMWj7jZke/?taken-by=foxesevents&hl=en; Feb. 10, 2017, 1 page.
Idea Stage 2 Piece Box—https://www.ideastage.com/Cube-Shaped-Candy-Set-965458328; Oct. 13, 2017, 2 pages.
Sugarwish 2 Piece and 4 Piece Boxes—https://web.archive.org/web/20151201071311/https:/sugarwish.com/choose-a-sugarwish; Dec. 1, 2015, 1 page.
Sweet Lounge 2 Piece Box—https://www.sweetlounge.co.uk/lounge-box-hello-spring-collection-for-vegans/; Oct. 16, 2017, 6 pages.
Sweet Lounge 3 Piece and 4 Piece Box Photo—Instagram—https://www.instagram.com/p/BM_eHn6g8ly/?taken-by=sweetloungeuk; Nov. 19, 2016, 1 page.
Sweet Lounge 3 Piece and 4 Piece Box Photo—Instagram—https://www.instagram.com/p/BMY_iidAMwX/?taken-by=sweetloungeuk; Nov. 4, 2016, 1 page.
Sweet Lounge 4 Piece Box—Instagram—https://www.instagram.com/p/BNMnfaJgwOo/?taken-by=sweetloungeuk; Nov. 24, 2016, 1 page.
Sweet Lounge 4 Piece Box—https://www.sweetlounge.co.uk/lounge-box-hello-spring-collection/; Oct. 16, 2017, 7 pages.
Sweet Lounge 4 Piece Box Video Snapshots—Facebook—https://www.facebook.com/sweetloungeuk/videos/vb.670728213008752/1188285557919679/?type=2&theater; Nov. 16, 2016, 6 pages.
Sweet Pete's 8 Piece Box—www.sweetpetescandy.com/collections/create-a-box; Nov. 18, 2016, 2 pages.
Sweitzer Candy 3 Piece Box Photo—Instagram—https://www.instagram.com/p/440XveluqO/?taken-by=sweitzercandy; Jul. 8, 2015, 1 page.
Sweitzer Candy 4 Piece Box Photo—Instagram—https://www.instagram.com/p/440XveluqO/?taken-by=sweitzercandy; Apr. 16, 2015, 1 page.
Sweitzer Candy 8 Piece Box Photo—Instagram—https://www.instagram.com/p/wLDm8Olujs/?taken-by=sweitzercandy; Dec. 4, 2014, 1 page.
Webb Company 2 Piece Box Photo—Facebook—https://www.facebook.com/webbcollection/photos/a.376918812240.156708.376836382240/10154628557212241/?type=3&theater; Oct. 18, 2016, 1 page.
Webb Company 4 Piece Box—https://www.facebook.com/webbcollection/photos/a.376918812240.156708.376836382240/10154602255037241/?type=3&theater; Oct. 11, 2016, 1 page.
Weeny Beeny 3 Piece Box Photo—Facebook—https://www.facebook.com/weenybeeny123/; Jan. 31, 2017, 1 page.
Weeny Beeny 4 Piece Box Photo—Facebook—https://www.facebook.com/weenybeeny123/; Jan. 31, 2017, 1 page.
Beach Picnic Image (Date Unknown), 1 page.
10 fanciest candies from Sugarfina's New York shop—NY; http://www.nydailynews.com/life-style/eats/10-fanciest-candies-sugarfina-new-york-shop-article-1.2407237; Oct. 22, 2015; 9 pages.

(56) References Cited

OTHER PUBLICATIONS

A Candy Emporium for Adults; https://www.entrepreneur.com/article/236286; Aug. 25, 2014; 10 pages.
A Sweet Evening at Sugarfina—SavvySleepers; https://www.savvysleepers.com/blogs/the-benefits-of-satin/44181636-a-sweet-evening-at-sugarfina; Aug. 31, 2015; 7 pages.
Candy Critic:Boxes and Boxes of Gummies From Sugarfina; http://candy-critic.blogspot.com/2013/05/boxes-and-boxes-of-gummies-from.html; May 2, 2013; 2 pages.
Luxurious One-of-a-Kind Candy Shop Tour With Sugarfina—Best Friends for Frosting; https://bestfriendsforfrosting.com/2015/11/luxurious-one-kind-candy-sugarfina/; Nov. 17, 2015; 16 pages.
Drool Worthy Sweets in Cute Packaging Beckon at Sugarfina Candy Shop; http://www.7x7.com/drool-worthy-sweets-in-cute-packaging-beckon-at-sugarfina-candy-shop-1787196138.html; Jul. 15, 2015; 4 pages.
Emiiichan Blog_Sugarfina candy order; https://emiiichan.blogspot.com/2014/11/sugarfina-candy-order.html; Nov. 2014, 18 pages.
Fancy candy brand selects fancier Dallas destination for Texas debut; http://dallas.culturemap.com/news/restaurants-bars/10-29-15-sugarfina-highland-park-village-market-candy/; Oct. 29, 2015; 4 pages.
Jonathan Adler Sugarfina Bento Boxes_InStyle.com; http://www.instyle.com/lifestyle/news/sugarfina-loves-jonathan-adler-collection; Apr. 11, 2016; 2 pages.
Kasey's Kitchen: Kasey's Favorite Thing #20: Sugarfina; http://kaseyskitchentv.blogspot.com/2013/12/kaseys-favorite-thing-20-sugarfina.html; Dec. 17, 2013; 3 pages.
NYC Guide: Sugarfina—York Avenue; https://yorkavenueblog.com/nyc-guide-sugarfina/; Oct. 26, 2015; 74 pages.
Rebecca's Delights: Sugarfina Gourmet Candy—Author Rebecca Kelsey Sampson; http://rebeccakelsey.com/2012/11/rebeccas-delights-sugarfina-gourmet-candy; Nov. 12, 2012; 6 pages.
People Freaked Out So Hard Trying to Get Rosé Gummy Bears that They Crashed the Website; https://www.forbes.com/sites/meghancasserly/2013/04/09/sugarfina-facebook-candy-shop-outerspace/#78cb39dd6e74; Jun. 29, 2016; 14 pages.
Rosie O'Neill of Sugarfina—The Everygirl; http://theeverygirl.com/rosie-oneill-of-sugarfina; May 18, 2014; 27 pages.
Sugar & Charm // Sugarfina—Mary Costa Photography; http://marycostaphotography.com/sugar-charm-sugarfina/; Apr. 22, 2014; 24 pages.
Sugar Fix: Sugarfina Pasadena; https://studiodiy.com/2015/07/21/sugar-fix-sugarfina-pasadena/; Jul. 21, 2015; 15 pages.
Sugarfina—A Unique Candy Boutique at The Americana; http://www.realmomofsfv.com/2014/06/18/sugarfina-a-unique-candy-boutique-at-the-americana/; Jun. 18, 2014; 28 pages.

* cited by examiner

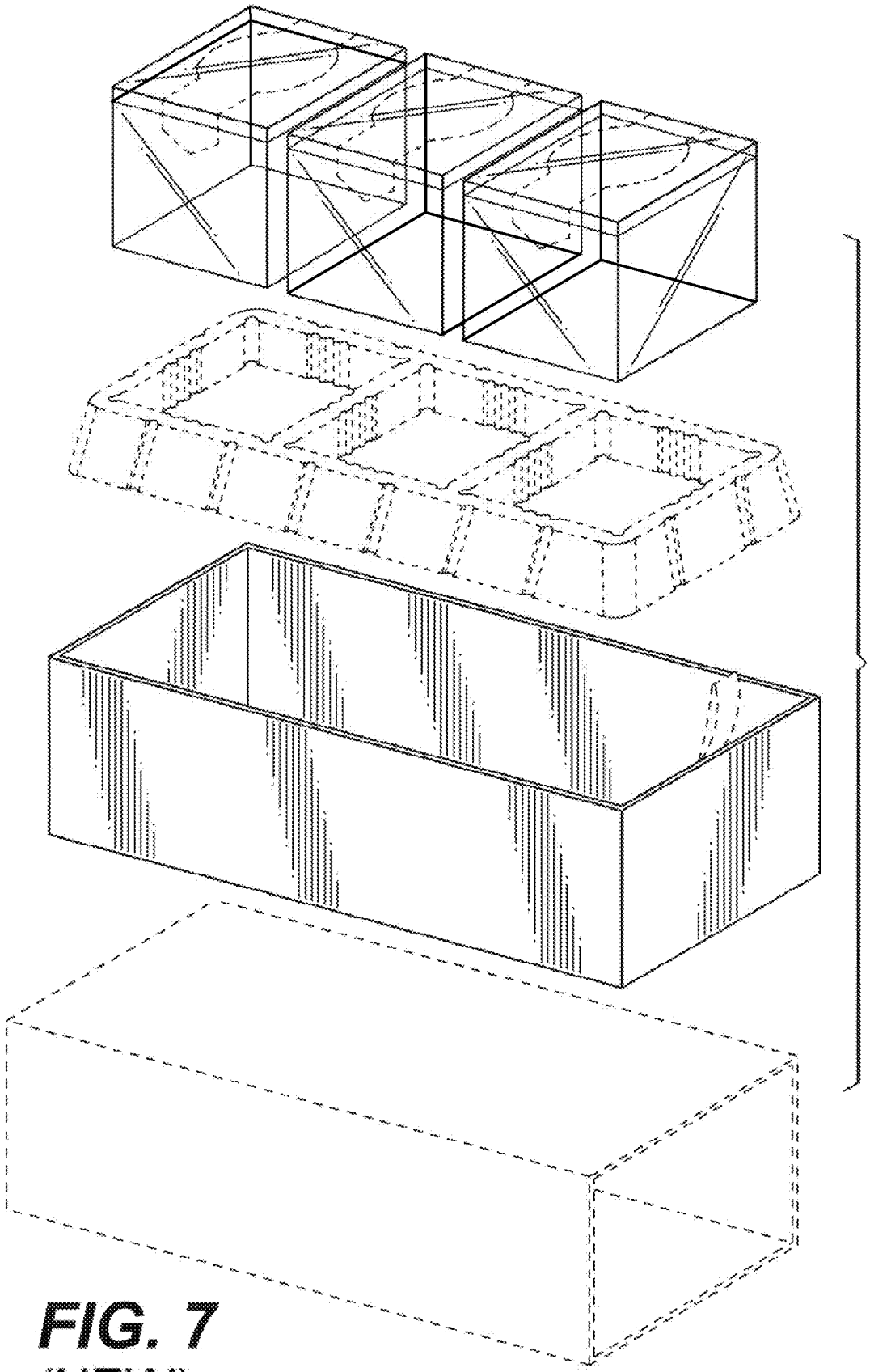
FIG. 7
(NEW)

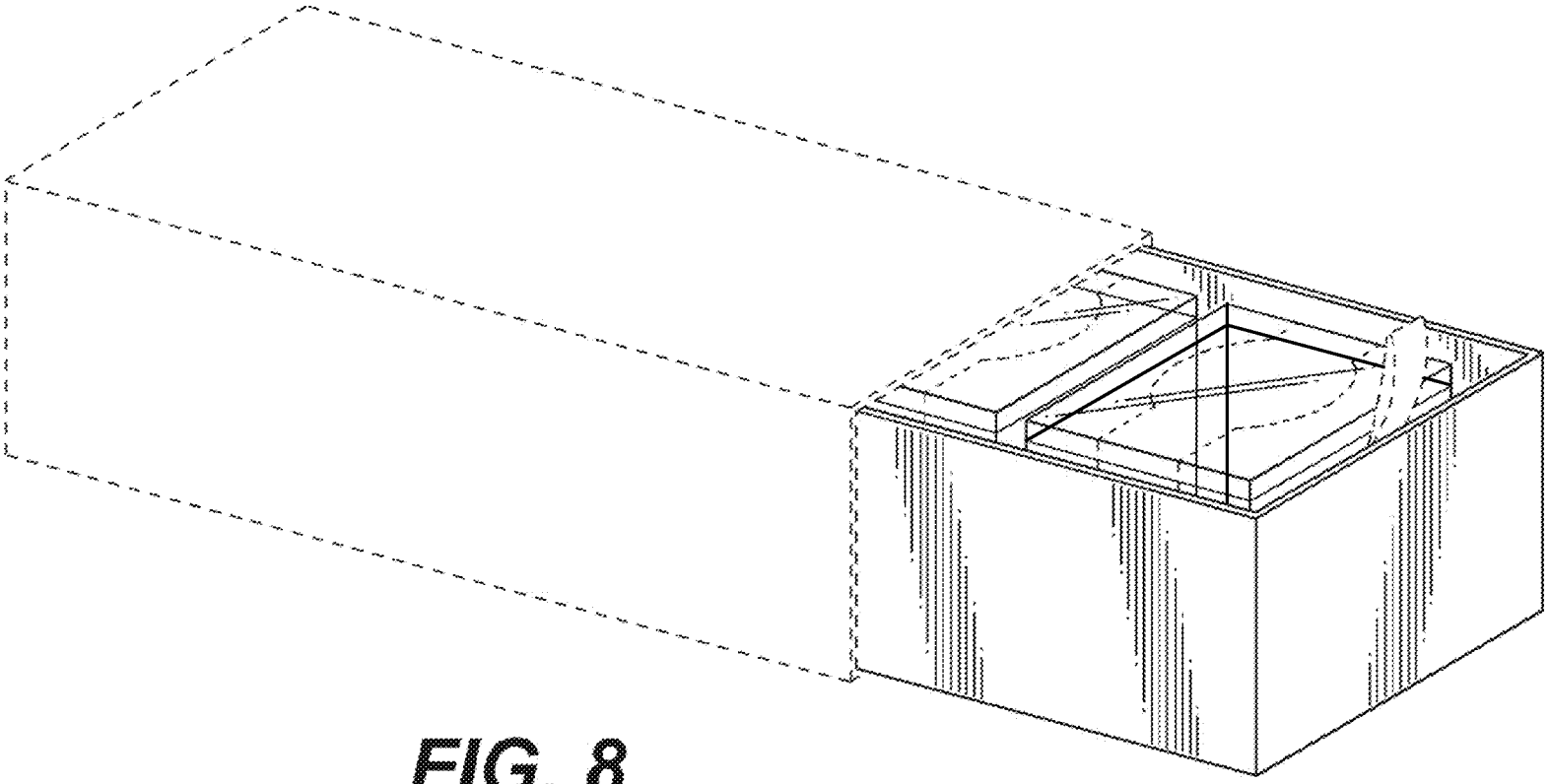
FIG. 8
(NEW)

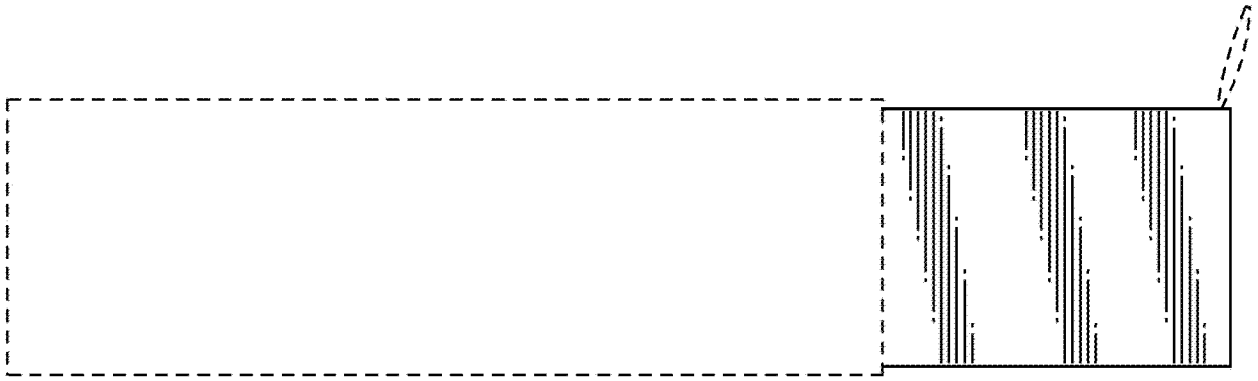
FIG. 9
(NEW)
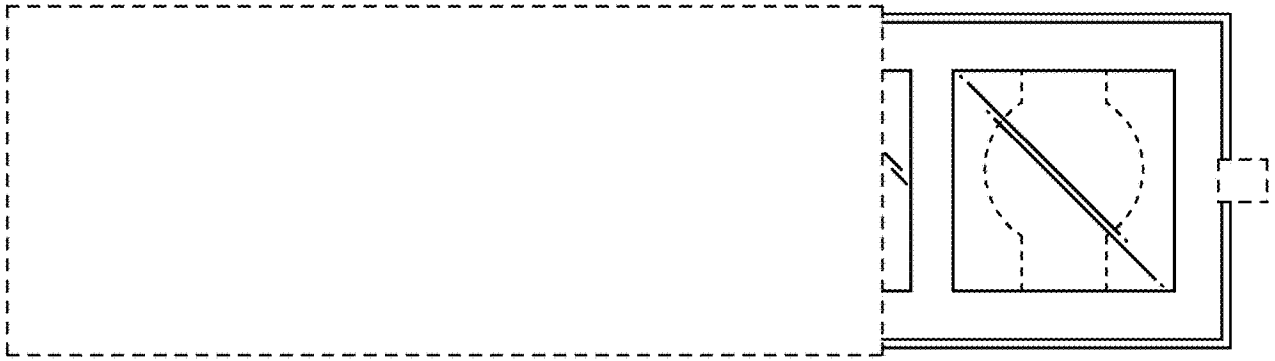
FIG. 10
(NEW)

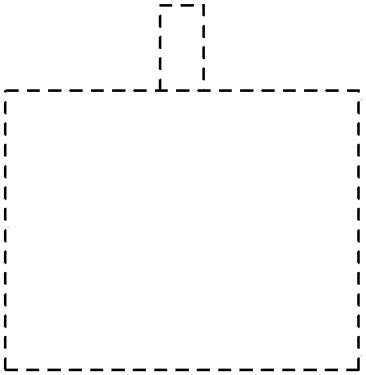
FIG. 12
(NEW)
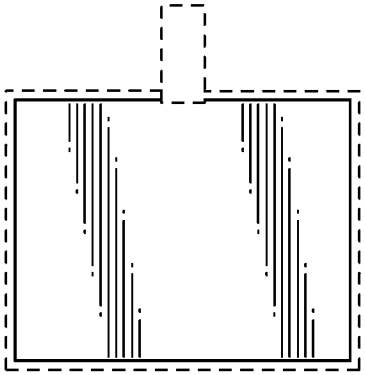
FIG. 11
(NEW)